Sept. 23, 1952  N. V. S. KNIBBS  2,611,683
HYDRATION OF LIME
Filed Dec. 1, 1948
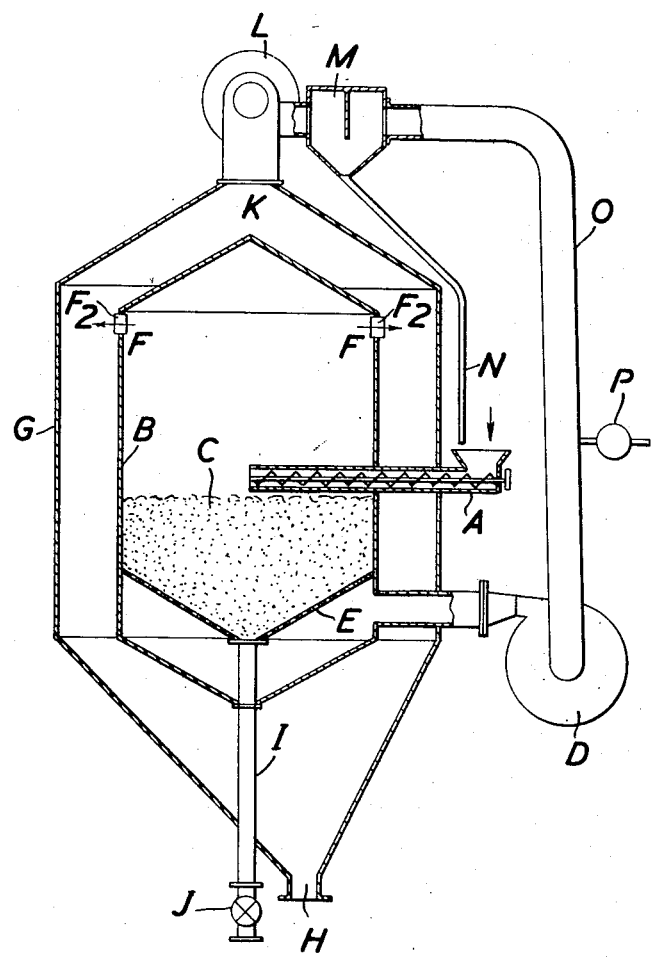
Inventor
Norman Victor Sydney Knibbs
By Stevens, Davis, Miller & Mosher
his Attorneys Patented Sept. 23, 1952

2,611,683

UNITED STATES PATENT OFFICE 2,611,683

HYDRATION OF LIME

Norman Victor Sydney Knibbs, Longfield, England

Application December 1, 1948, Serial No. 62,897
In Great Britain December 2, 1947

4 Claims. (Cl. 23—188)

This invention relates to the hydration of lime to produce a dry or substantially dry hydrated lime powder, and to the separation of impurities therefrom.

As is well known, when pieces of lime are moistened with water, they combine to form hydrated lime and at the same time, if the water is suitably limited in quantity, the lumps disintegrate to a powder. Since ordinary commercial lime generally contains some over-burnt lime, unburnt limestone and impurities, which do not break down to a fine powder, it is usual, after hydration, to screen or air-separate the product in apparatus separate from the apparatus in which hydration occurs.

It is also known that the combination of lime and water is exothermic and that water in excess of that entering into the reaction is converted into steam by the exothermic heat. During hydration the solids in the hydration vessel become fluidized by the steam evolved in the process, that is to say, the solid particles are surrounded and lifted by the water vapour in such a way that the mixture becomes like a fluid in constant agitation. It appears to boil and it flows like a liquid. This phenomenon is known as that of the "fluidized or boiling bed," and the adjustment of the proportions and conditions of the lime and water to produce the phenomenon are matters of experience to those skilled in this art and will thus be referred to hereinafter as forming a "fluidized bed."

I have previously proposed such a fluidized bed to increase the efficiency of hydration and effect a partial separation of hydrated from unhydrated lime and impurities. In the said process as carried out hitherto, the hydration vessel is deep and trough-shaped, lime and water are fed in at one end and hydrate overflows over a weir which is provided at the outlet end of the hydrator. Because of the fluidized condition of the contents of the hydrator, the finest and lightest particles tend to come to the surface while passing towards the outlet and to flow over the weir whilst the larger and heavier unhydrated particles tend to remain in the lower portion until hydration reduces them to a fine powder. Whilst this separation is a valuable aid to the hydration process, increasing the efficiency of hydration, it is not sufficiently complete to give a hydrate of lime suitable, without further separation, for most purposes.

The present invention is an improvement in my prior process with the object of improving the efficiency of separation in the hydrator itself so that hydrate is produced of the required fineness without further separation, and also of decreasing the mechanical wear on the plant so that maintenance costs are reduced, especially when dealing with an abrasive lime or lime containing abrasive particles, such as the flint in chalk lime.

According to the present invention, a process for carrying out the hydration of lime comprises bringing together the lime and water in a reaction vessel to form a fluidized bed and causing steam, air, or an inert gas to pass into or through the bed, to further fluidize it, and carry the suspended particles away from the coarser material, and separating the suspended particles from the latter while maintaining a temperature sufficient to prevent condensation of water vapour until after the said separation.

Conveniently a space is provided above the fluidized bed for the suspended particles to assemble so that the coarser particles separate and fall back to the bed while the finer particles are carried upwardly and withdrawn from the upper part of the said space into an outer vessel where they may be precipitated by cyclone action.

As will be shown hereinafter, with suitable arrangement of plant, the temperature within the reaction zone and separation zone is more than maintained by the exothermic heat liberated during the reaction.

In carrying out the present invention, a mixture of lime, conveniently crushed to about ¼ inch, and water, in the required proportions, is fed by any convenient means, as for example by a worm conveyor, to the hydration vessel, which may conveniently be cylindrical in shape with its axis vertical and with a conical bottom. The proportion of water will depend upon the quality of lime employed. In most cases the theoretical quantity would produce a violent reaction which would cause the temperature to rise above 100° C. In such cases a sufficient excess of water may be added to maintain the required temperature, steam generated being used, with additional steam or air blown into or under the bed, to fluidize the lime.

The gases serve not only to fluidize the bed of lime but also to carry off the fine particles of hydrate as they are formed which pass up the cylindrical vessel suspended in the gas stream and out through an opening or openings at or near the top into a second or outer vessel so designed as to separate the powder from the gases. The second vessel may, for example, be a cyclone separator. From this second vessel the gases may pass to a fan which pumps them back through the perforations or other inlets under or into the fluidized bed in the first vessel. Means of washing the gases free from any fine lime which is not completely abstracted by the second or separating vessel may be provided as part of the fan equipment or as a separate unit before the gases pass to the fan. There may also be means of releasing to the atmosphere a portion of the gases, so that steam generated in the hydration process may be eliminated.

By adjusting the rate of circulation of the gases, control may be effected of the fineness of the hydrate carried from the first vessel. If desired, baffles or other means of control may also be provided.

At the bottom of the conical base of the hydration vessel, means may be provided for abstracting from that vessel continuously or intermittently the residue of unhydratable lime or impurities introduced with the good lime into the system.

When the plant is started, the circulating fan may conveniently pump air round the system, but when a bed of lime is formed and hydration is occurring, the steam evolved may replace the air which may be eliminated at the blow-off point, and thereafter water vapour, substantially free from air, circulates around the system. The bed may therefore be fluidized by water vapour, and the lime and hydrate throughout the whole system is then always in contact with water vapour at about 100° C. Since the hydration reaction is highly exothermic the temperature in the system would tend to rise much above 100° C., but for ordinary purposes the hydrate formed at or near 100° has the most desirable properties. The temperature is therefore controlled and maintained slightly above 100° by the use of an excess of water introduced with the lime. The heat produced by the reaction evaporates the excess water, and the excess steam produced, over and above that required for circulation and fluidizing, is eliminated through the blow-off point already mentioned. This blow-off point should be located after the means of washing the dust out of the steam so that lime dust is not lost to the system. The lime dust recovered in the washing device, together with the water used for washing, may be returned to mix with the lime fed to the hydration vessel, and the washing device also serves the purpose of preheating the water for hydration.

One means of carrying out the invention will now be described with reference to the drawing which shows diagrammatically in vertical section a suitable form of apparatus. Crushed lime is fed at a measured rate, by means of a feeder (not shown) into the worm conveyor A. In this conveyor it is mixed with hot water or milk of lime, produced as described later, and the mixture enters the cylindrical vessel B and falls on to the bed of material C in the vessel. This bed of lime is fluidized partly by steam evolved from its own hydration and partly by steam or air or both from the fan or turbo-blower D, which blows air into C through the perforated base E. The steam or air-steam mixture passing through the bed C carries with it the particles of hydrate formed by reaction. Above the bed C the space is empty and a separation is effected therein of coarse particles, which return to the bed, and fine particles which are carried up and out of B. Depending on the fineness required of the hydrate it may be desirable or necessary to have the area of the fluidized bed larger or smaller than that of the upper empty portion, the diameter being adjusted accordingly. The gases carrying the fine hydrate leave B through circumferential openings F at the top of B and these openings are preferably supplied with louvre or deflecting plates $F_2$ which impart a circular motion to the gases as they leave. The dust and gases pass into the outer cylindrical vessel G when the decrease in velocity and the cyclone action cause a separation of the hydrate which falls to the bottom and is removed through the opening H. Any unhydratable residue finds its way to the bottom of the fluidized bed and is removed through a tube I and a rotary valve J, at the required rate. The gases from which the hydrate has separated pass up through the top of the cylinder G and leave through a central opening K to a fan-washer L, where they meet fresh water which scrubs out any remaining dust. This fan-washer is of known type, as already used in the hydrating plant and process already referred to. The water used passes through a control valve and meter and the amount is adjusted to maintain the correct temperature in the circulating gases. The gases and the water, now heated and containing lime dust in suspension, pass out into a baffle box M, where the water separates and passes down the tube N to mix with the lime entering the hydrator. The washed gases pass on via tube O to the fan D. Excess steam generated in the process is exhausted through a relief valve P to atmosphere.

The rate of rotation of valve J or the operation of any other type of valve used in that position, may conveniently be controlled by the pressure of the gases after the blower D. If the depth of bed C increases, the pressure rises, and this rise of pressure may be made to increase the speed of rotation of J or to open any other type of valve, whilst a decrease of pressure, caused by too shallow a bed C, may be made to decrease the speed or close the valve.

The process described embodies the re-circulation of the steam to effect fluidizing and to carry off the fine hydrate, but it is within the scope of the invention to use air or other gas for those purposes, taking in fresh air at the fan continuously, and eliminating air and steam after the separating chamber and without recirculation, but preferably through a washing device to recover the fine dust and to preheat the water used for hydration.

It will be appreciated that the hydration vessel, the second or separating vessel, and the subsidiary portions of the plant may take a variety of forms and yet still come within the scope of the invention. To avoid condensation of water on the walls of the plant, it is desirable that the whole of it should be lagged.

Ordinarily it will not be necessary to provide moving parts within the hydration vessel. All necessary agitation is provided by the fluidizing gas. Consequently abrasion and wear on the mechanism is reduced to a minimum.

I claim:

1. A process for hydrating lime which comprises forming a fluidized bed by mixing with crushed lime a proportion of water adjusted so that the excess over that required to form the hydrate will be vaporized by the exothermic heat of hydration, passing an inert gaseous medium through the fluidized bed of solid particles thus formed from beneath the bed to augment and maintain the fluidized state and carry the finer of the fluidized particles to a zone above the bed containing the fluidized crushed lime, separately collecting the said finer particles by withdrawing them while in suspension above the bed into a separating zone adjacent the reaction zone, and maintaining a temperature sufficient to prevent condensation of water vapor until after the said separation.

2. A process as defined in claim 1 in which the finer particles that are withdrawn while in suspension above the bed and thereafter introduced into the separating zone are further separated in said separating zone into finely divided hydrated lime product which is removed from a point adjacent the bottom of said separating zone, and a hydrated lime dust which is removed from a point adjacent the top of said separating zone in the form of a suspension in said inert gaseous medium.

3. A process for hydrating lime which comprises forming a fluidized bed by mixing with crushed lime a proportion of water adjusted so that the excess over that required to form the hydrate will be vaporized by the exothermic heat of hydration, passing steam and air through the fluidized bed of solid particles thus formed from beneath the bed to augment and maintain the fluidized state and carry the finer of the fluidized particles to a zone above the bed containing the fluidized crushed lime, separately collecting the said finer particles by withdrawing them while in suspension above the bed into a separating zone adjacent the reaction zone, and maintaining a temperature sufficient to prevent condensation of water vapor until after the said separation.

4. A process for hydrating lime which comprises forming a fluidized bed by mixing with crushed lime a proportion of water adjusted so that the excess over that required to form the hydrate will be vaporized by the exothermic heat of hydration, passing steam and air through the fluidized bed of solid particles thus formed from beneath the bed to augment and maintain the fluidized state and carry the finer of the fluidized particles to a zone above the bed containing the fluidized crushed lime, separately collecting the said finer particles by withdrawing them while in suspension above the bed by cyclone action into a separating zone adjacent the reaction zone, and maintaining a temperature sufficient to prevent condensation of water vapor until after the said separation.

NORMAN VICTOR SYDNEY KNIBBS.

REFERENCES CITED

The following references are of record in the file of this patent:

UNITED STATES PATENTS

| Number | Name | Date |
|---|---|---|
| 803,506 | Reaney | Oct. 31, 1905 |
| 845,190 | Osborne | Feb. 26, 1907 |
| 1,066,718 | Doherty | July 8, 1913 |
| 1,565,107 | Rich | Dec. 8, 1925 |
| 1,613,341 | Carson | Jan. 4, 1927 |
| 1,634,424 | Hunter | July 5, 1927 |
| 1,954,211 | Kuntz | Apr. 10, 1934 |
| 2,358,497 | Egloff | Sept. 19, 1944 |
| 2,397,485 | Hemminger | Apr. 2, 1946 |
| 2,448,135 | Becker et al. | Aug. 31, 1948 |
| 2,477,042 | Burnside | July 26, 1949 |
| 2,485,317 | Roetheli | Oct. 18, 1949 |
| 2,498,710 | Roetheli | Feb. 28, 1950 |

FOREIGN PATENTS

| Number | Country | Date |
|---|---|---|
| 257,793 | Great Britain | Sept. 9, 1926 |
| 637,756 | Great Britain | May 24, 1950 |